UNITED STATES PATENT OFFICE.

CHARLES DE LA ROCHE, OF PARIS, FRANCE.

PROCESS OF REFINING OILS.

SPECIFICATION forming part of Letters Patent No. 625,933, dated May 30, 1899.

Application filed December 29, 1898. Serial No. 700,603. (No specimens.)

*To all whom it may concern:*

Be it known that I, CHARLES DE LA ROCHE, engineer, of 6 Rue Gaston de St. Paul, in the city of Paris, Republic of France, have invented Improvements in the Treatment of Oils and Fats, and Particularly of Drying Oils, of which the following is a full, clear, and exact description.

This invention relates to improvements in the treatment of oils and fats, generally including essential oils, and more particularly of drying oils.

The process of this invention is based on the property possessed by carbid of calcium of absorbing water and humidity. Thus vegetable oils—such as linseed-oil, for example—are not really siccative until they have been subjected to a prolonged boiling at 360°, which is the boiling-point of the oil, at which temperature the greater part of the moisture of the oil is evaporated, and the mucilaginous matters, which boiling is incapable of driving off, combine with the oleic acid in consequence of the addition of litharge or manganese to form a new product of a very deep color and readily drying. According to my invention I utilize the deliquescent properties of carbid of calcium to take up the moisture contained in the oil without necessarily employing heat, a precipitate of lime containing the water and mucilaginous matters held in suspension in the oil, which prevent it from drying, being obtained. From successive experiments made I am able to state that not only may the so-called "drying vegetable oils" be thoroughly purified by this means, but that the complete neutralization of oils by the entire elimination of their acid elements or ferments may also be effected. The advantage possessed by this process of dispensing with the use of heat in the first operation is that it enables the oil to retain its natural color or is even less colored and is undoubtedly more brilliant than the normal oil.

The process as applied to the rectification of essential oils, particularly spirits of turpentine, has the advantage over all rectifying processes by distillation with the aid of heat of entirely dispensing with the use of the latter, and consequently enabling the oils or spirits to retain their most volatile constituents and leave their normal coloration unchanged. Moreover, the essential oils now sold in commerce are all more or less acid, which can be readily proved by placing the oils, even cold, in a copper vessel, when a deposit of verdigris immediately forms thereon, accompanied a greenish coloration of the liquid. By this process, however, this acidity, whether of oils or essential oils, is neutralized by the lime resulting from the decomposition of the carbid of calcium; similarly as regards the water contained in all essential oils of commerce unless they have been subjected to one or two rectifications. By my process the moisture is completely eliminated, thus enabling the cheap production for making varnishes of essential oils absolutely free from water, which is a highly-important advantage, as will be recognized. The apparatus used for recifying essential oils are similar to those used for treating other oils. A further result of the process is that linseed-oil, for example, when treated in the manner before described will dry in three days and remain absolutely as glossy as a varnish, while if it be raised to ebullition for an hour or two it will hardly change color, even if a certain proportion of manganese, litharge, or other oxid be added for promoting drying, which then takes place in a few hours. The advantage will be apparent to makers of oil varnishes, inasmuch as boiled and drying linseed-oil (treated by my process) when added to melted resin will not increase the depth of color, but will diminish it. Oil varnishes much less highly colored than those hitherto produced can in this manner be obtained, which constitutes one of the most important advantages of the invention.

For the purpose of this process I use as a hydroextractor an ordinary mixer containing crude linseed-oil, to which is added about ten per cent. of powdered carbid of calcium, the mixture being stirred for about an hour, the acetylene produced being disengaged and the carbid converting the oil into a greenish mixture, due to its conversion into lime, which has absorbed the whole of the moisture. It then only remains to settle and decant, or even filter-press, in order to obtain a nearly-colorless limpid bright drying-oil free from oil moisture or acidity. For boiling this oil the process is the same as for ordinary oil, three to five per cent. of lead oxid or manganese being added during the boiling.

The filter-press cakes are a valuable by-product in that they still contain unspent carbid, which may be utilized for the production of acetylene for lighting the works by merely adding a little caustic potash to the water in the vessel into which the cakes are thrown in order that the fatty matters which isolate the carbid may be attacked.

I have merely outlined the principle of the invention and may adopt such improvements as experience may determine without departing from the invention.

The principal advantages obtained by my process are, first, a considerable diminution of the color of oil varnishes and a far superior luster even when the oils used have been kept for several years in cellars; second, by the absence of all acidity these varnishes are no longer liable to become cloudy or non-transparent and may be used immediately after their manufacture, the same advantages being also obtained in the manufacture of driers for distemper colors and varnishes; third, paint is prevented from cracking and a brilliancy is imparted to colors, due to the purity of the oil, which permits in many cases of dispensing with varnishing, which is a frequent cause of injury to works of art; fourth, it prevents paintings from becoming spotted or presenting dull patches; fifth, it prevents change of tone in colors produced by the too slow oxidation by the air of crude oils containing acid and mucilaginous substances charged with moisture; sixth, the oil when once hard retains a gloss which enables it to be used in many cases as a varnish which is not liable to crack or cause the cracking or deterioration of the colors on which it is applied as a protection against the action of the air.

I claim—

The process of freeing oils and fats siccative oils and essential oils from moisture and acid which consists in mixing the same with carbid of calcium whereby the moisture in the oil or fat attacks the carbid forming acetylene gas and lime and the lime thus formed neutralizes any acid in the oil or fat, and finally separating the oil or fat from the precipitated lime and impurities, substantially as described.

The foregoing specification of my improvements in the treatment of oils and essential oils, and particularly of drying oils, signed by me this 13th day of December, 1898.

CHARLES DE LA ROCHE.

Witnesses:
 HENRI DUCASSE,
 ALBERT DUVERJER.